United States Patent

[11] 3,538,832

| [72] | Inventor | Henry J. Koeber, Jr.<br>Deerfield, Illinois |
|---|---|---|
| [21] | Appl. No. | 735,278 |
| [22] | Filed | June 7, 1968 |
| [45] | Patented | Nov. 10, 1970 |
| [73] | Assignee | Bell & Howell Company<br>Chicago, Illinois<br>a corporation of Illinois |

[54] SEMIAUTOMATIC CAMERA FOCUSING DEVICE WITH HEIGHT COMPENSATION
10 Claims, 7 Drawing Figs.

[52] U.S. Cl............................................. 95/44,
350/41, 352/140, 353/101
[51] Int. Cl........................................... G03b 3/00
[50] Field of Search.......................................... 95/44.45;
353/101; 355/58; 352/140, 139; 350/41.46

[56] References Cited
UNITED STATES PATENTS
1,258,459 3/1918 Read............................ 95/44

Primary Examiner—Norton Ansher
Assistant Examiner—Richard L. Moses
Attorney—William F. Pinsak and John E. Peele, Jr.

ABSTRACT: A distance determining mechanism, for use in a camera having a focusable objective, the device utilizes a pendulous cam member for computing subject distances by virtue of its particular angular orientation within the camera. The pendulous member is used through the principal of triangulation to determine the required distance, wherein the angle from which the photographer views the subject is critical. The novelty resides in a height compensating device for correcting the angular orientation of the pendulous member for differences in the height of users.

Inventor:
Henry J. Koeber, Jr.

SEMIAUTOMATIC CAMERA FOCUSING DEVICE WITH HEIGHT COMPENSATION

The present invention relates to an improvement in a distance determining mechanism for a camera having an objective lens which is adjustable according to focal distances, which distances are determinable by the mechanism in the form of a pendulous rangefinder. Particularly, the invention relates to a control device for compensating for variations in vertical displacement as attributable to differences in the heights of users.

Pendulous distance determining mechanisms for determining the distance between a camera and a subject are known. One such pendulous mechanism by which the distance is determined by the principle of triangulation is described in a copending application, 735,231 filed on even date herewith, titled "CAMERA FOCUSING MECHANISM USING TRIANGULATION PRINCIPLE," and assigned to the assignee of the present application. That application discloses an improved pendulous rangefinder mechanism which can be used in a camera for fixing the position of an adjustable objective lens wherein that lens is focused on a remotely located subject. According to that application, a pendulous member swings relative to the optical axis defined by an objective lens to an aspect corresponding to focal distance as determined by the inclination of the axis. The axis is angled at the base of the subject along a line intersecting the vertical extent of the subject at a point substantially horizontal with the base plane above which the camera is located. In that mechanism, the pendulous member has a cam formation computed at substantially eye level of an average adult. When the objective lens is adjusted into a position as determined by that cam formation, the focal plane of the objective lens focuses the image of the remote subject on the film plane of the camera.

The mechanism described in that application is satisfactory for use in the manner intended. However, an error factor is generated by variations in the heights of users from the "average" height for which the mechanism is preset. This error factor is introduced into the distance determinations substantially in proportion to the variation of the users height from "average."

The present invention provides a distance determining mechanism having a means to compensate for the variation in the height of the user, which compensation can be introduced by the user and altered readily if the instrument is to be used by a user of another height. More particularly, a pendulous member having a cam surface is arranged for adjustment to alter the point of engagement of the cam surface relative to the objective. Notwithstanding the compensation adjustment mechanism, the distance determining mechanism may be selectively operated in either an automatic mode or a manual mode.

Thus, an object of the present invention is to provide a novel distance determining device having compensation for height variations.

Another object of the invention is to provide a distance determining device having a user adjustable height variation compensating system.

Yet another object of the invention is to provide a distance determining device with a height variation compensating system adapted for use on an optical instrument having an objective lens focusable to a compensated distance when the distance is automatically determined.

Still another object of the invention is to provide a triangulation range determining device having a compensation system for automatic operation and a manual override.

Further and other objects will be apparent from the description of the accompanying drawings in which like numerals refer to like parts.

The "height of the user" for the purpose of setting the height adjustment dial is herein defined as the top of the head of the user, when standing erect, and is empirically related to that height above the subject supporting plane. The angle to be determined is the angle of inclination of the optical axis of the instrument to a point where a vertical line through the subject intercepts the supporting plane. The term "base of the subject" refers to the point of interception of the vertical line through the subject and the supporting plane. If the subject is a standing person, as are a large percentage of photographs, the "base of the subject" is understood to be the feet of the subject. If the planes of support are different, the "base" should be considered the line of interception of the vertical line by the support plane of the user.

Figure 1:
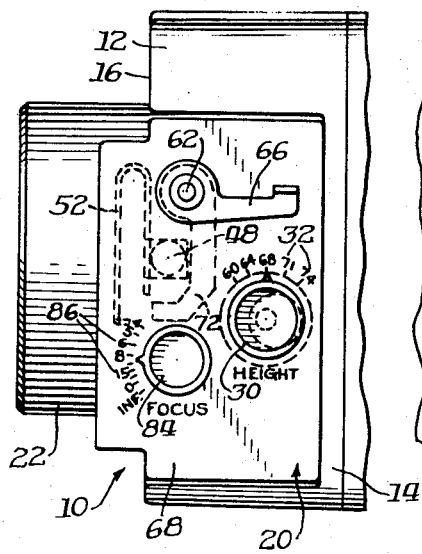
FIG. 1 is an elevational view of a portion of an optical instrument incorporating the mechanism of the present invention.

Referring now to FIG. 1, there is shown a portion of an optical instrument, such as a camera 10, having a housing 12 including at least side wall 14 and front wall 16. The housing encloses a viewfinder system (not shown) having a reference mark relative to which the base of a viewed subject may be aligned. Distance measuring device 20 is attached to housing 12 for adjustment of the focus of focusable objective lens 22 mounted to front wall 16 of housing 12. Focusing of the objective is accomplished by movement of a lens cell, shown in FIG. 4 as element 24, wherein the focal plane of objective lens 22 causes the image of a remote subject to be made coincident with a not shown film plane in the camera. A change of either the distance between the camera and the subject or of the plane on which the objective is focused, causes the image to be focused on other than the film plane. Thus, the objective lens must be capable of being focused for a range of camera-to-subject distances.

Figure 6:
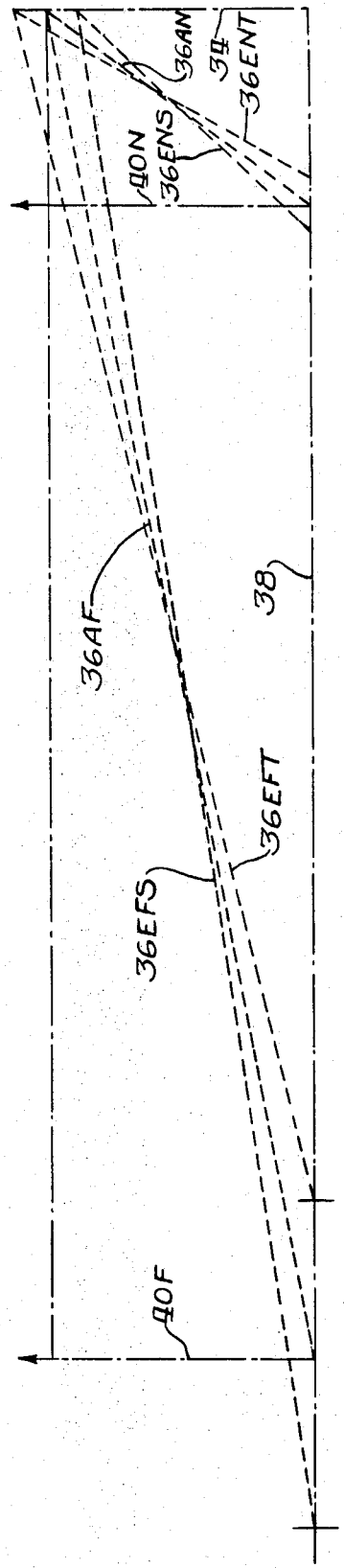
FIGS. 6 and 7 are diagrammatic views explaining the principles of triangulation, and comparing the error factor not compensated and compensated, respectively.
Figure 7:
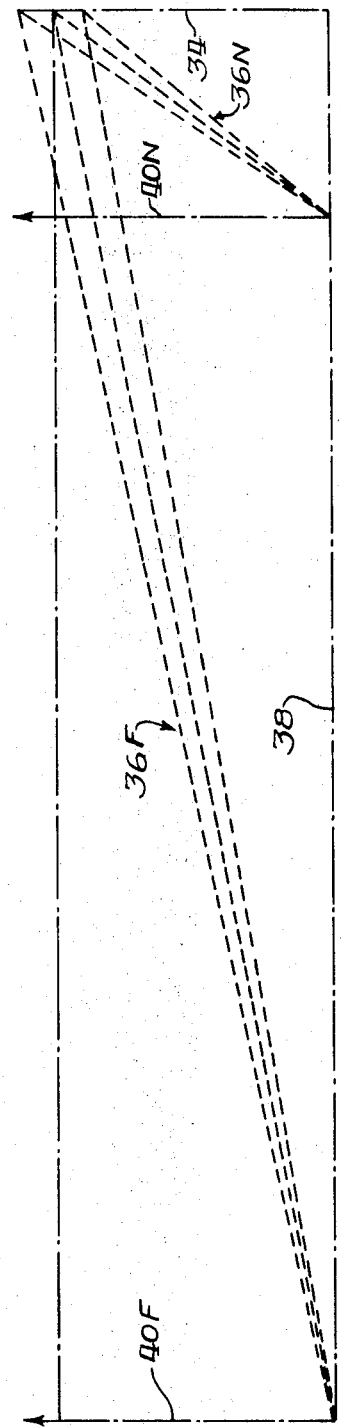

On side wall 14 of camera housing 12 in FIG. 1 is further located a height adjustment dial knob 30 which is positionable with respect to indicia defining a height indicating scale 32. The height scale defines a range of heights of users of the instrument. Knob 30 permits a user to adjust accurately the triangulation system to the height setting or adjustment for his own height. This adjustment defines a vertical leg 34 of a right triangle as a function of the user's height by which the distance is determined using triangulation with the distance determining device 20. The principle of triangulation requires at least one known linear value, herein the height or vertical leg 34 of the right triangle as seen in FIGS. 6 and 7. With this known value, an arrangement for computing the angle of inclination of the hypotenuse 36 of that triangle relative to that vertical is further required. From these values, the length of a base line or horizontal leg 38 of the triangle from the vertical to a remote subject 40 can be determined.

To compute the angle of inclination of this preferred construction, a pendulous member 44 (FIGS. 2 and 3) is arranged to pivot to a gravity influenced position in response to inclination of the objective lens 22 having an optical axis coinciding with the hypotenuse 36 of the triangle. The base line 38, assumed to be horizontal, defines the support plane on which both the user and the subject are assumed to stand.

The user is assumed first to be of the "average" height to which a noncompensating range determining device is factory adjusted. The angle of the hypotenuse of the triangle to the base of a near subject 40N will cause the pendulous member 44 to pivot so as to indicate accurately the distance to the subject as suggested by the dashed line 36 AN. Similarly, the angle assumed by the optical axis or hypotenuse 36 AF to the base of a more distant subject 40 F will be accurate for determination of that distance. However, should the user be taller or shorter than "average", accuracy of the focusing device will be reduced.

The hypotenuse of the "error" triangles are suggested in FIG. 6 by dashed lines 36 EN and 36 EF. When a tall or short person inclines a camera to sight and align the base of a subject 40 with the reference mark in the camera's viewfinder, the pendulous member 44 is adjusted to an erroneous angle. The error factor results from the fact that the cam surface of the pendulous member 50 was computed for an average. The error factor resulting when a tall person views a subject causes the objective lens to be focused short, since the angle is smaller than average. The converse is true for a short person. If this error were not compensated for, the objective lens would be focused ahead of the subject as shown in FIG. 6 by 36 EFT and 36 ENT when a tall person uses the instrument and beyond the subject when a short person uses the instrument.

Adjusting the pendulous member 44 to correspond to the height of the user causes the error generated by a consistent angular orientation of that member to be compensated for. As seen in FIG. 7, focus is determined accurately at near and far distances by adjusting the pendulous member in a vertical manner to alter the translation of the inclination of the instrument housing to a correct distance indication. As schematically shown in FIG. 7, a user of "average" height or a shorter or taller than "average" user should each determine the subject to be at the same distance from the camera.

Figure 2:
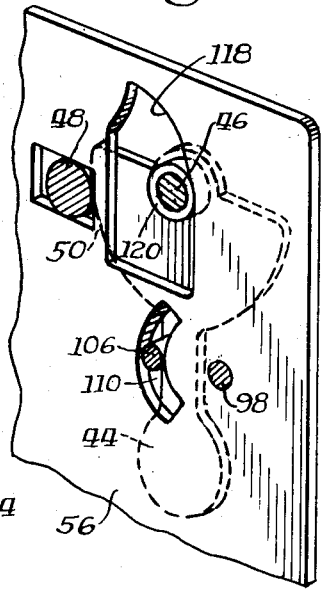
FIG. 2 is an enlarged perspective view, with parts broken away and parts removed, of the adjustable pendulous member of the present invention.
Figure 3:
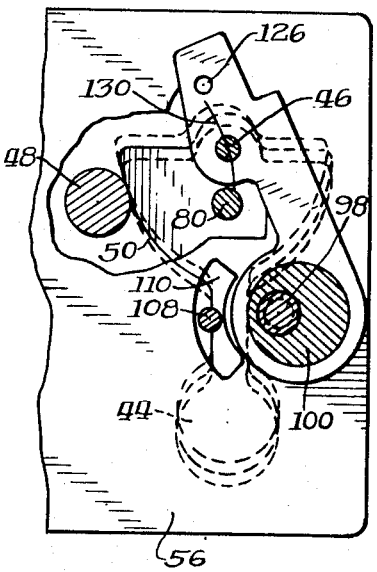
FIG. 3 is an enlarged elevational view similar to FIG. 2 with parts broken away.

Pendulous member 44, shown in FIGS. 2 and 3, is supported about a support axle 46 for free swinging movement under the influence of gravity when in a released condition. After the member swings about axle 46 to an adjusted position, lens cell positioning pin 48 engages cam surface 50 of the member to lock that member in the adjusted position and to position lens cell 24 in response to that adjustment. Pin 48 is arranged for sufficient back and forth movement to change the focus distance of objective lens 22 throughout a predetermined range. Pin 48 moves between a position clear of cam surface 50 of pendulous member 44 and a pendulous member engaging or locking position. A resilient member, shown as U-shaped spring 52, continuously urges pin 48 toward engagement with the cam surface of member 44. One leg of spring 52 is anchored in holders 54 of a mechanism plate 56, which is supported in housing 12.

Pin actuator member 60 is supported on mechanism plate 56 by shaft 62, on which control lever 66 is supported exterior of a mechanism chamber cover plate 68, as seen in FIG. 1. Internally of the mechanism chamber, shaft 62 also supports lever arm 72 for movement with control lever 66 between a manual position (FIG. 5) upwardly from the inoperative or neutral position (FIGS. 1 and 4), and an automatic position downwardly therefrom. Tang 74 extends from the lower end of lever arm 72 into cutout 76 in actuator member 60. Through tang 74, movement of control lever 66 adjusts lens cell positioning pin 48, which extends through a receiver, shown as aperture 78, in the actuator member. Aperture 78 is slightly larger than the dimensions of the positioning pin to permit the pin to pass therethrough with a small amount of relative overtravel between the members when either moves.

Figure 5:
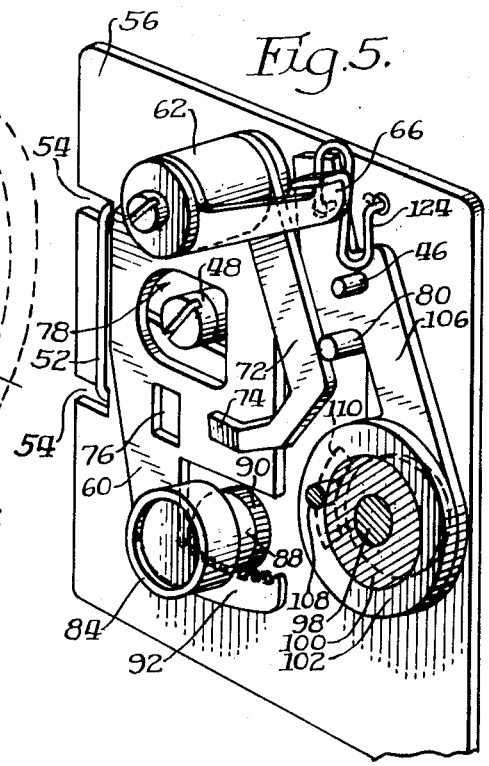

Manual pivoting upwardly of control lever 66 causes rotation of shaft 62 and lever arm 72 so as to pull tang 74 out of cutout 76 in actuator member 60, as shown in FIG. 5. Tang 74 is angled so as to press against member 60 when retracted from cutout 76 onto the surface of the member. When the tang is out of the cutout, member 60 is pressed into frictional engagement against plate 56 to prevent rotation of knob 84 by spring 52. Upward rotation causes an edge of lever arm 72 to engage stud 80, staked to pendulous member 44 radially of axle 46, via stud 80, arm 72 pushes the pendulum into vertical orientation from an orientation other than vertical in which the member might have been last adjusted. Cam surface 50 of member 44 is thus moved clear of the path of positioning pin 48 to permit the pin to be adjusted manually throughout the focusing range of objective lens 22.

To manually focus objective lens 22 after raising control lever 66, the user adjusts an external manual dial knob 84 with respect to indicia defining a distance scale 86 which is indicative of the range of focus of the objective lens. Rotation of the knob, which is fixed to stub shaft 88, rotates that shaft and pinion 90 fixed to the internal end thereof. Pinion 90 meshes with rack 92 formed on actuator member 60. Upon rotation of knob 84, actuator member 60 moves about shaft 62 and adjusts positioning pin 48 to position lens cell 24 of objective lens 22 for the distance indicated by scale 86. Pendulous member 44 is not free to pivot about axle 46, since lever arm 72 has engaged stud 80. Further, although the pendulum may be in a compensated position, it has no effect upon the positioning of pin 48 which is positively positioned. Since the pendulous member has been pushed to a vertical or infinity orientation, cam surface 50 thereof is only in the path of pin 48 when the lens cell is adjusted to "infinity."

Figure 4:
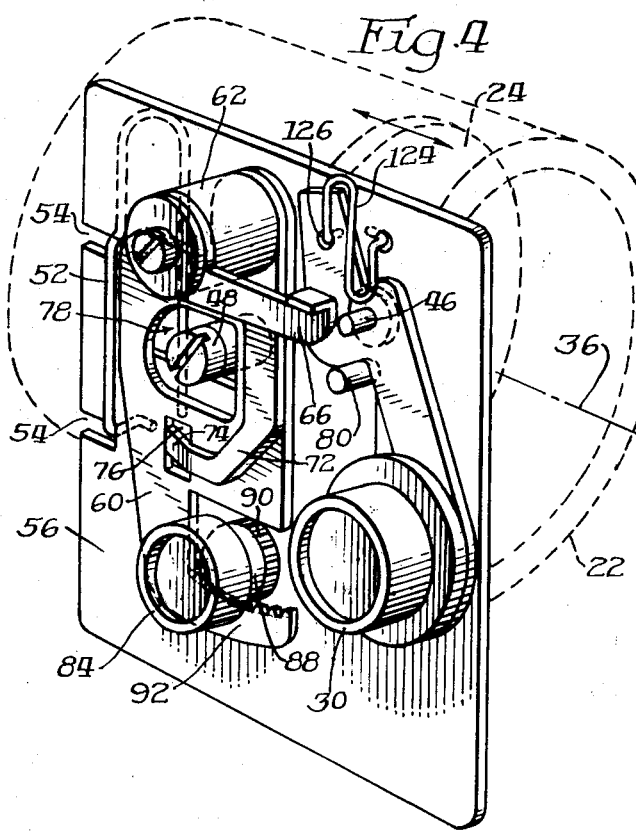
FIGS. 4 and 5 are enlarged perspective views of the mechanism of the invention with parts removed and parts in section, shown in alternate conditions.

Automatic focusing of objective lens 22 is enabled by downwardly pivoting control lever 66, which causes pivotal rotation of lever arm 62 clockwise as oriented in FIGS. 4 and 5. Simultaneously, actuator member 60 is rotated in the same direction by tang 74 on lever arm 72. From a manual condition, movement of member 60 is initiated when tang 74 frictionally slides over the member into cutout 76. Actuator member 60 is then pushed by tang 74. Positioning pin 48 is engaged by an edge of receiver 78 and moved clear of cam surface 50 of pendulous member 44 to one end of its range of movement. The pendulous member is now permitted free movement about axle 46 under the influence of gravity in response to the inclination of optical axis 36 of the objective lens 22.

After pendulous member 44 assumes a new or adjusted position, control lever 66 is released to return to the neutral position as oriented in FIG. 4. Release of the control lever permits actuator member 60 to return to its normal position whereby positioning pin 48 is thus urged by spring 52 into engagement with cam surface 50 of pendulous member 44 to position lens cell 24 according to the orientation of the pendulous member.

Adjustment of the position of the pendulous member to compensate for height variations is accomplished by rotation of height adjustment knob 30. This knob is supported in mechanism plate 56 upon axle stud 98. Axle stud 98 passes eccentrically into bearing portion 100 which is rotatable within carrier ring 102 of elevator member 106. From the internal end of the knob, stop lug 108 is positioned radially of axle stud 98, to move with the knob in an arcuate path when the knob is rotated. The arc through which the knob is rotatable is thus defined by cutout 110 in mechanism plate 56 into which extends stop lug 108.

Elevator member 106 is operatively connected to height adjustment knob 30 by bearing portion 100 and carrier ring 102 to adjust the position of pendulous member 44 in response to rotation of the knob. As seen in FIG. 3, as axle stud 98 is rotated by knob 30, the elongated elevator member is caused to be raised and lowered. Near the upper end of the elevator member, pendulous member supporting axle 46 is fixed in motion transferring relationship with pendulous member 44. As elevator member 106 shifts substantially longitudinally, cam surface 118 (FIG. 2) of mechanism plate 56 alters the path of movement of axle 46 from a straight line path. A cam follower, shown as bushing 120 which surrounds axle 46, engages cam surface 118 so as to guide the upper end of elevator member in a shallow arc upon longitudinal movements of that member. To ensure engagement of bushing 120 against cam surface 118, a biasing member shown as spring 124, is connected in a hole 126 of the elevator member and into the mechanism plate 56.

The height adjustment mechanism adjusts the position of pendulous member 44 along arcuate path 130, as shown in FIG. 3, to ensure that the pendulous member always hangs vertically, yet with cam surface 50 engaging pin 48 when at the infinity orientation. The pendulous member may be raised or lowered so that positioning pin 48 will be engaged by cam surface 50 at different positions when adjusted under the influence of gravity. Because of the variations in the point of contact, lens cell 24 is positioned by different amounts for the same orientation of pendulous member 44 through the range of adjustment of elevator member 106. Thus, accurate range determinations are made across the range of focus of objective lens 22.

It is to be understood that the embodiment shown is illustrative of the principal operation of a focusing mechanism which ensures proper focus of a camera lens and that certain changes, alterations, modifications or substitutions can be made in the structure of the device without departing from the spirit and scope of the claims.

I claim:

1. Improvements in a range determining device using the principle of triangulation adapted for use in an instrument having a focusable objective and a housing adapted for orientation about a predetermined axis to an angle defining the hypotenuse of a triangle, the device comprising:
    a pendulous member supported in said housing for adjustment under the influence of gravity when said housing is angled to focus said objective;
    a pendulous member supporting axle means about which said pendulous member is movable upon orientation of said housing;
    height compensating means for adjusting said supporting axle means substantially vertically relative said housing; and
    whereby said pendulous member adjusts accurately the focus of said focusable objective so as to compensate for variations in height of the pivot of said pendulous member above a base line of the triangle.

2. A device as in claim 1, wherein said height compensating means comprises a manually adjustable positioning member operatively connected with said pendulous member.

3. A device as in claim 1, wherein said height compensating means comprises:
    a longitudinally movable elevator member supporting said axle means for movement substantially longitudinally of the path of the movement of said elevator member; and
    a manual control member operatively connected with said elevator member to longitudinally position said elevator member.

4. A device as in claim 3, wherein a cam surface causes said longitudinally movable elevator member to move said axle means in an arcuate path.

5. A device as in claim 4, wherein a biasing member urges a cam follower on said elevator member against said cam surface.

6. A device as in claim 5, wherein an eccentric means on said manually adjustable means operably positions said elevator member.

7. A device as in claim 1, comprising an actuator member for focusing said objective, said actuator member being positionable by a manually rotatable means.

8. A device as in claim 1 wherein said height adjusting means comprises:
    a manually operable positioning knob;
    an eccentric member driven by said knob;
    elevator means operably connected with said eccentric member for substantially linear movement upon adjustment of said eccentric member; and
    means connecting said elevator means to said pendulous member to adjust said member in a substantially linear path of movement.

9. A device as in claim 8 including a cam in said housing for modifying said substantially linear path of movement of said pendulous member.

10. A device as in claim 8 including objective focusing means arranged to engage said pendulous member throughout its range of adjustment whereby focusing in response to the adjusted position of said pendulous member, said objective is focused at a compensated distance.